UNITED STATES PATENT OFFICE.

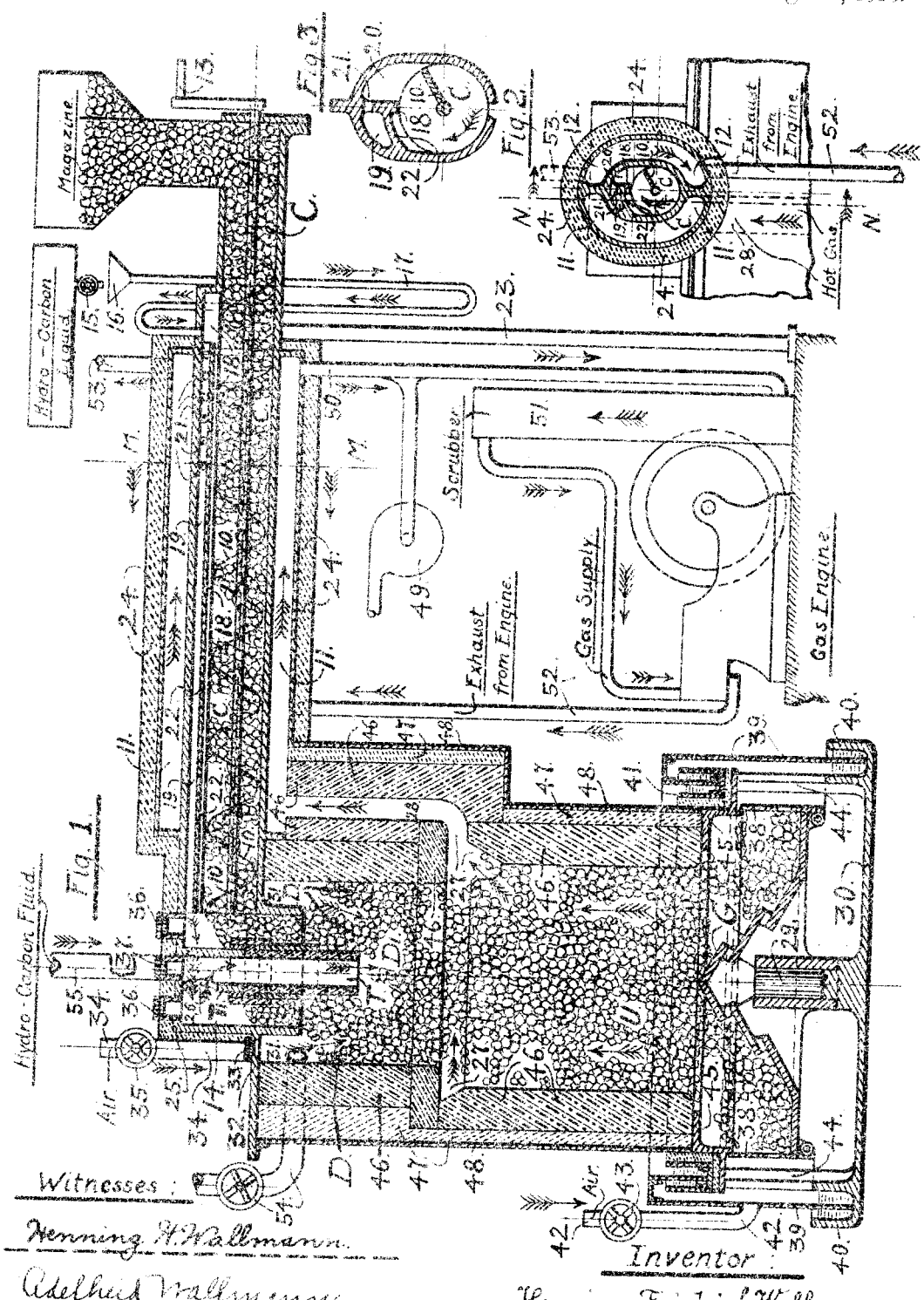

HENNING FRIEDRICH WALLMANN, OF CHICAGO, ILLINOIS, ASSIGNOR OF ONE-HALF TO ADELHEID WALLMANN, WILHELM ROGER WALLMANN, AND HENNING HEINRICH WALLMANN, ALL OF CHICAGO, ILLINOIS.

PROCESS OF GENERATING TARLESS GAS.

1,195,934.  Specification of Letters Patent.  Patented Aug. 22, 1916.

Application filed December 17, 1912. Serial No. 737,734.

*To all whom it may concern:*

Be it known that I, HENNING FRIEDRICH WALLMANN, a citizen of the United States of America, residing at Chicago, in the county of Cook and State of Illinois, have invented certain new and useful Improvements in Processes of Generating Tarless Gas, of which the following is a description, reference being had to the accompanying drawing, forming a part of this specification, in which corresponding letters and numerals of reference in the several figures indicate like parts.

My invention relates to processes by which hydrocarbonaceous fuel is distilled and by which the volatile ingredients evaporated thereby as well as the combustible contained in the resulting residue are converted into a tarless, permanent, fixed gas of uniform quality; and the objects of my improvements are first, to continuously deliver hydrocarbonaceous fuel into and through a distillation-conduit C, to heat and distil the fuel therein, and to discharge separately from each other, the resulting residue of distillation and the generated distillates from said conduit C into a down-draft combustion-chamber D and into a down-draft decomposing-chamber D¹ respectively; second, to burn within said combustion-chamber D a part of the combustible contained in said residue of distillation by a first supply of air and preferably of steam to carbonic acid, to thereby heat said residue of distillation to incandescence and to discharge the resulting incandescent residue as well as the generated hot carbonic acid into said decomposing chamber D¹, thereby heating and decomposing condensible distillates and consuming carbon disengaged therefrom; third, to discharge into an up-draft gas-generating and combustion chamber, U, the rest of said residue of distillation, to convert the combustible contained therein by a second supply of air and preferably of steam into semi-watergas and to preferably mix the latter with the gas treated chemically within said decomposing chamber D¹; fourth, to utilize the perceptible heat of the resulting gas mixture for promoting the distillation of fuel freshly supplied into the distillation conduit C; fifth, to also utilize a part of the chemical energy of the resulting gas mixture for promoting the distillation of said freshly supplied fuel; and sixth, to increase the heat value of the generated gas mixture by adding to a supply of solid fuel, a supply of hydro-carbon fluid.

The theory underlying the design of this gas generating apparatus will be understood in realizing the principal object of my process which object is to convert volatile hydro-carbons into tarless, permanent, fixed gas without decomposing or destroying the chemical character of said hydro-carbons to any greater degree than is necessary in order to prevent a future condensation of substantial parts thereof with their temperature lowered to that of the prevailing atmosphere.

When hydro-carbons are partly consumed by a limited supply of air at ordinary temperature, the hydrogen is burnt first with a discharge of carbon in the finely divided shape of smoke, soot or lamp black. In order to preserve as much as possible, the chemical character of hydro-carbons, it is necessary to prevent their coming into contact with a substantial amount of free oxygen. I prevent this by leading the previously evaporated hydro-carbons by means of a suitable canal T into such depth below the surface of an incandescent fuel bed as prevents the hydrogen being consumed by free oxygen. Instead, I mix the evaporated hydro-carbons with hot carbonic acid of such a temperature as sufficiently decomposes the hydro-carbons for converting the same into a permanent, fixed gas, thereby dis-engaging carbon which combines in its nascent state with the hot carbonic acid, and in being converted into carbon-monoxid reduces said acid also to the same gaseous substance. In order to mix the gaseous hydro-carbons with carbonic acid, the combustion chamber D should not be made so high that said acid is reduced to carbon-monoxid by its engaging with solid carbon of the residue of distillation before the mixing of the gaseous fluids takes place. Otherwise the carbon dis-engaging from the heated hydro-carbons cannot be consumed and in being partly filtered from the gas during its passage through the fuel bed, reduces as well the gas-passages therethrough as it augments the toil to be taken for cleaning the gas. This part of my process is therefore considered to be of importance.

I preferably carry out my process in the apparatus illustrated in the annexed drawing, in which, Figure 1 is a vertical section through the main parts of my gas-generator, partly at the line N—N of Fig. 2, Fig. 2 is a vertical section at the line M—M of Fig. 1, and Fig. 3 is an enlarged view of a detail. Appurtenances are indicated in diagrammatical form.

Solid hydro-carbonaceous fuel such as bituminous coal, lignite, peat, wood in suitable pieces, etc., may drop from a suitable magazine into a preferably horizontal distillation conduit C provided with a screw-conveyer 10 and partly inclosed by two oppositely located heating jackets 11 and 12. The screw-conveyer 10 may be revolved by means of the crank 13 or by any other suitable means for delivering solid fuel from a suitable magazine into a chamber 14 located above and communicating with the down draft combustion-chamber D. Liquid fuel from a suitable source may be introduced through the valve 15, the funnel 16 and the trap 17 into the distillation-conduit C. A projection 18 on the inside surface of the inclosure of the conduit C prevents or impedes a rotation of solid fuel with the screw conveyer 10. Distillates generated near the entrance for fuel into the conduit C may flow through canals 19 and 20 into the chamber 14, said canals being separated from each other by a partition, being a part of said projection 18, and communicating with each other through perforations 21 provided in said partition. This construction is for the purpose of preventing or impeding the entrance of solid fuel into the canal 19 with the screw-conveyer 10 revolving in the direction indicated by arrows and with a wall 22 between the canal 19 and the space traversed by the revolving screw 10. The horizontal conduit C with the canals 19 and 20 and the heating jackets 11 and 12 is supported on one of its two ends by the wall surrounding the down-draft chambers D and $D^1$ and on the other of its ends by a suitable support 23. A jacket of non-heat-conducting material 24 protects said heating jackets 11 and 12 on their outside against much loss of heat. In the center part of the chamber 14 is provided the tube $T^1$ rigidly connected to the cover or top plate 25 of said chamber 14 and provided with an opening or with openings 26 oppositely located in relation to the inlets for distillates and for residue of distillation from the distillation-conduit C. An entering of solid fuel into said opening or openings 26 is thus prevented or impeded. To the lower part of said tube $T^1$ is securely fastened a prolongation or extension T of refractory or fireproof material such as fireclay, porcelain or carborundum, and this prolongation T extends downwardly within the chamber or vessel 14 and for some distance of about 20 to 30 centimeters beyond the lower end thereof through the down-draft combustion chamber D to the upper part of the down-draft decomposing chamber $D^1$ being located directly below and in direct communication with said chamber D and with the lower end of said tube T. Said chamber 14 and said tube T are open at their under sides and constructed to supply separately from each other residue of distillation and distillates into the chambers D and $D^1$ respectively. The lower part of the chamber 14 is surrounded by an annular air chamber 31 closed at its top by a plate 32 with properly constructed poke-holes (only one shown) 33 and an air inlet tube 34. A valve 35 may be used for regulating the air supply, and in some cases the air used for combustion may be mixed with a regulated amount of steam from any suitable source. The top plate 25 of the chamber 14 may be provided with holes and lids 36 for inspection and poking, and the tube $T^1$ may be provided at its upper end with a hole and lid 37 for the same purpose. Located below the down-draft decomposing chamber $D^1$ and directly communicating therewith is the up-draft gas generating chamber U and intermediate between the chambers $D^1$ and U is provided in the wall or walls surrounding these chambers a circular recess 27 with a gas outlet 28 leading into the heating jacket 11. The fuel in the chamber U is supported by a rotatable step-grate G suitably journaled in its center part about a pin or shaft 29 rigidly secured to a circular base plate 30 or to the foundation carrying the gas generator. Vertical auxiliary grates 38 may be hinged to the circumference of the step grate G and be surrounded by the circular apron 39 of a double water seal, the apron extending into a lower trough 40 and into an upper trough 41. An air supply pipe 42 may lead air through the apron 39, and the supply of air, which may preferably be mixed with a regulated amount of steam from any suitable source may be regulated by the valve 43. Upright supports 44 carry the upper water seal 41 and the ring 45 carrying in turn the walls of the chambers U, $D^1$, D and 14 with the structural parts connected thereto. The walls surrounding the chambers U, $D^1$ and D consist of fire bricks 46 surrounded in turn by non-heat-conducting material 47 and by a sheet iron or sheet steel shell 48. By lifting the apron 39 up and out of both water troughs 40 and 41 access may be had to the lower part of the chamber U for the removal of ashes and clinkers. By connecting a counterpoise by means of small cables and over rollers to the apron 39, a lifting of the latter may be facilitated. From the heating jacket 11 the generated gas may be sucked by means of an exhauster 49 or a gas engine through the tube 50, and may be delivered by the exhauster 49 to any desirable location, or the gas, after having passed through the scrubber 51, may be consumed in the gas engine, and the resulting hot products of combustion may be discharged through the tube 52 into the heating jacket 12 and from there through the tube 53 into the atmosphere.

A tube and valve 54 may be provided in communication with the recess 31 for the purpose of leading products of combustion from the chamber U into the atmosphere, preferably through a chimney, when fire is kindled on the step-grate G or when the operation of the generator is discontinued.

In the case that there exists a demand for a gas of relatively very high heating value, hydro-carbon fluid in the form either of gas and vapors or of liquid fuel may be supplied from any suitable source through tubes 55, T¹ and T into the down-draft decomposing chamber D¹. However it should be remembered that if liquid fuel is thus used, a certain amount of solid fuel consumed in the combustion chamber D is capable to evaporate a limited amount only of liquid fuel and to supply the latent heat required for such evaporation. A maximum of heat value is attainable only if the liquid fuel is evaporated either by the perceptible heat of the generated gas or by another, separate source of heat which source preferably may consist in the waste heat usually lost in the operation of internal combustion engines.

The apparatus operates as follows: With the valve 54 open and the apron 39 lifted up out of the troughs 40 and 41, a fire is kindled on the step-grate G and more fuel, preferably coke or anthracite gradually added until the chambers U, D¹ and D are occupied by solid fuel. By lowering the apron 39 and by admitting air and steam through the pipe 42 and the valve 43 into the chamber U, and closing the valve 54 semi-watergas will be generated with the exhauster 49 or the gas engine started to operate. By supplying solid fuel into the magazine and revolving the screw conveyer 10 and by supplying hydro-carbon in either solid or liquid form into the conduit C, the perceptible heat of the generated gas is transferred to and distils hydro-carbon in the conduit C. The generated vapors or distillates flow through the canals 19 and 20 into the chamber 14 and through the hole 26 and the tubes T¹ and T into the chamber D¹ toward the recess 27 and the gas outlet 28, also coming into contact with solid incandescent fuel at the top of the chamber U. By admitting air through the tube 34, and the valve 35, the recess 31 and the chamber D into the chamber D¹, the distillates issuing from the tube T are mixed with air and ignited by coming into contact with the incandescent fuel at the top of chamber U. The resulting fire rises until the fuel in the chamber D is incandescent. Thereafter the apparatus is in its normal working condition.

My process does not necessarily require a combustion in the chamber U. The greatest part of the solid fuel may be consumed in chamber D and the remainder be withdrawn in the form of coke from the lower part of chamber U.

In order to continuously deliver solid fuel from the magazine through the conduit C toward the chamber 14, the screw conveyer 10 may be connected by means of the crank 13, or by means of any other suitable mechanism such as a ratchet gear, etc., to a motor, line shaft or to any other suitable source of motion with regulated speed, preferably with speed automatically regulated in accordance with the amount of fuel simultaneously consumed. But on the other hand, by making the vessel 14 high and large enough, it becomes a store-room or magazine for coke, into which magazine coked fuel may be delivered from time to time by the operation of the screw 10 and from which magazine the coked fuel may continually drop into the chamber D with the same speed with which fuel is consumed in the chambers D and U.

I wish to claim:—

1. The continuous process of gasifying which consists in, continuously moving portions of a mass of solid fuel from an inlet therefor through a distillation conduit, heating and thereby distilling fuel of said mass within said conduit, continuously separating resulting distillates from resulting residue of distillation, heating resulting separated residue to a temperature higher than that of fuel under distillation within said conduit, leading hydro-carbonaceous fluid into resulting hotter residue, thereby decomposing said fluid, separating resulting gaseous products from said hotter residue, and continuously delivering the latter after its said separating from said gaseous products into a receptacle for solid combustible.

2. The continuous process of gasifying which consists in, continuously moving portions of a mass of solid fuel from an inlet therefor through a distillation conduit, heating and thereby distilling fuel of said mass within said conduit, continuously separating resulting distillates from resulting residue of distillation, increasing the temperature of resulting separated residue by leading into the latter a gaseous heating agent, leading hydro-carbonaceous fluid into resulting hotter residue, thereby decomposing said fluid, separating resulting gaseous products from said hotter residue, and continuously delivering the latter after its said separating from said gaseous products, into a receptacle for solid combustible.

3. The continuous process of gasifying which consists in, continuously moving portions of a mass of solid fuel from an inlet therefor through a distillation conduit, leading fluid not containing a consequential amount of air in its natural chemical character into fuel of said mass within said conduit, simultaneously heating and thereby distilling fuel of said mass within said conduit, continuously separating resulting gaseous fluid mixture from resulting residue of distillation, heating resulting separated residue to a temperature higher than that of fuel under distillation within said conduit, leading hydro-carbonaceous fluid into resulting hotter residue, thereby decomposing said hydro-carbonaceous fluid, separating resulting gaseous products from said hotter residue, and continuously delivering the latter after its said separating from said gaseous products, into a receptacle for solid combustible.

4. The continuous process of gasifying which consists in, continuously moving portions of a mass of solid fuel from an inlet therefor through a distillation conduit, heating and thereby distilling fuel of said mass within said conduit, continuously separating resulting distillates from resulting residue of distillation, heating resulting separated residue to a temperature higher than that of fuel under distillation within said conduit, leading hydro-carbonaceous fluid into resulting hotter residue, thereby decomposing said fluid, continuously separating resulting gaseous products from the latterly said residue, and consuming combustible contained in the latter by supplying air thereto after the latterly said separating.

5. The process of gasifying which consists in, moving a mass of solid fuel from inlet therefor into and through a distillation conduit, heating and thereby distilling fuel of said mass within said conduit, separating resulting distillates from resulting residue of distillation, increasing the temperature of resulting separated residue by leading into the latter a gaseous heating agent, leading hydro-carbonaceous fluid into resulting residue of increased temperature, thereby decomposing said fluid, separating resulting gaseous products from said residue of increased temperature, and consuming combustible contained in resulting separated, latterly said residue by supplying air thereto after the latterly said separating.

6. The process of gasifying which consists in, moving a mass of solid fuel from an inlet therefor into and through a distillation conduit, leading fluid not containing a consequential amount of air in its natural chemical character, into fuel of said mass, simultaneously heating and thereby distilling fuel of said mass within said conduit, separating resulting gaseous fluid from resulting residue of distillation, heating resulting separated residue to a temperature higher than that of fuel under distillation within said conduit, leading hydro-carbonaceous fluid into resulting hotter residue, thereby decomposing said hydro-carbonaceous fluid, separating resulting gaseous products from the latterly said residue, and consuming combustible contained in the latter by supplying air thereto after its said separating from said gaseous products.

7. The process of gasifying which consists in, moving a mass of solid fuel from an inlet therefor through a distillation conduit, leading combustible fluid into fuel of said mass within said conduit, simultaneously heating and thereby distilling fuel of said mass within said conduit, separating resulting gaseous fluid mixture from resulting residue of distillation, heating resulting separated residue to a temperature higher than that of fuel under distillation within said conduit, leading hydro-carbonaceous fluid into resulting hotter residue, thereby decomposing said hydro-carbonaceous fluid, separating resulting gaseous products from said hotter residue, and delivering the latter after its said separating from said gaseous products, into a receptacle for solid combustible.

8. The process of gasifying which consists in, moving a mass of solid fuel from an inlet therefor through a distillation conduit, leading combustible fluid into fuel of said mass within said conduit, simultaneously heating and thereby distilling fuel of said mass within said conduit, separating resulting gaseous fluid mixture from resulting residue of distillation, increasing the temperature of resulting separated residue by leading into the latter a gaseous heating agent, leading hydro-carbonaceous fluid into resulting hotter residue, thereby decomposing said hydro-carbonaceous fluid, separating resulting gaseous products from the latterly said residue, and delivering the latter after its said separating from said gaseous products, into a receptacle for solid combustible.

9. The continuous process of gasifying which consists in, continuously moving portions of a mass of solid fuel from an inlet therefor through a distillation conduit, continuously leading combustible fluid into fuel of said mass within said conduit, simultaneously heating and thereby distilling fuel of said mass within said conduit, continuously separating resulting gaseous fluid mixture from resulting residue of distillation, increasing the temperature of resulting separated residue by continuously leading into the latter a controlled amount of gaseous heating agent, continuously supplying hydro-carbonaceous fluid into resulting hotter residue, thereby continuously decomposing supplied hydro-carbonaceous fluid, continuously separating resulting gaseous products from the latterly said residue, and continuously delivering the latter after its said separating from said gaseous products, into a receptacle for solid combustible.

10. The process of gasifying which consists in, moving a mass of solid fuel from an inlet therefor through a distillation conduit, leading combustible fluid into fuel of said mass within said conduit, simultaneously heating and thereby distilling fuel of said mass within said conduit, separating resulting gaseous fluid mixture from resulting residue of distillation, increasing the temperature of resulting separated residue by leading into the latter a controlled amount of gaseous heating agent, supplying hydro-carbonaceous fluid into resulting hotter residue, thereby decomposing supplied hydro-carbonaceous fluid, separating resulting gaseous products from the latterly said residue, and consuming combustible contained in the latter by supplying air thereto after the latterly said separating.

11. The continuous process of distilling which consists in, continuously moving portions of a mass of solid fuel through a distillation conduit toward a receptacle for solid combustible, subjecting fuel of said mass within said conduit to temperatures gradually higher with respect to each other in the direction of said moving, preventing an entrance of a consequential amount of air of natural chemical quality into said conduit, continuously separating resulting distillates from resulting residue of distillation in directions transverse to the direction of said moving and at a plurality of points of the side inclosure of said conduit with said points arranged anteriorly and posteriorly with respect to each other and to the direction of said moving, and delivering resulting residue of distillation from said conduit toward a receptacle for solid combustible.

12. The continuous process of distilling which consists in, continuously moving portions of a mass of solid fuel from an inlet therefor through a distillation conduit and through an outlet of the latter toward a receptacle for solid combustible, subjecting fuel of said mass within said conduit to temperatures gradually higher with respect to each other in the direction of said moving, preventing an entrance of a consequential amount of air of natural chemical character into said conduit, leading combustible fluid into fuel of said mass within said conduit, continuously separating resulting distillates from resulting residue of distillation in directions transverse to the direction of said moving and at a plurality of points of the side inclosure of said conduit with said points intermediate between said inlet and said outlet and arranged anteriorly and posteriorly with respect to each other and to the direction of said moving, and delivering resulting residue of distillation from said outlet toward said receptacle.

HENNING FRIEDRICH WALLMANN.

Witnesses:
W. D. PENNINGTON,
ELLA E. MOE.